United States Patent

Kadowaki

[15] 3,643,894

[45] Feb. 22, 1972

[54] FILM MOVEMENT DIRECTION SWITCHING DEVICE FOR SMALL MOVIE PROJECTORS

[72] Inventor: Tatsusuke Kadowaki, Yokohama, Japan

[73] Assignee: Kabushiki Kaisha Ricoh, Tokyo, Japan

[22] Filed: Sept. 21, 1970

[21] Appl. No.: 73,726

[30] Foreign Application Priority Data

Sept. 29, 1969 Japan....................................44/77973

[52] U.S. Cl................................242/201, 242/205, 352/166

[51] Int. Cl........................................B11b 15/32, G03b 1/04

[58] Field of Search........................................242/201–205; 352/166, 168, 174; 74/810, 812

[56] References Cited

UNITED STATES PATENTS

| | | | |
|---|---|---|---|
| 2,647,435 | 8/1953 | Nemeth | 242/201 X |
| 2,907,531 | 10/1959 | Badgley | 242/205 |
| 3,159,841 | 12/1964 | Castedello et al. | 352/104 |

*Primary Examiner*—Leonard D. Christian
*Attorney*—McGlew and Toren

[57] ABSTRACT

A film movement direction switching device, for small movie projectors, includes an externally accessible control knob for switching the direction of rotation of the main shaft of the projector between a normal film feed forward direction and a film rewind reverse direction, as well as to disconnect the main shaft from a driving motor. A spindle driving mechanism is coupled to the main shaft and is automatically drivingly engaged with the takeup reel spindle upon rotation of the main shaft in a normal direction, with the supply reel spindle being idly rotatable, and is automatically drivingly connected to the supply reel driving spindle when the main shaft is rotated in the reverse direction, with the takeup reel spindle rotating idly. In the neutral position of the control, the drive mechanism is disconnected from both spindles. Selectively operable clutch means are provided additionally for rotating the supply reel spindle in the film rewind direction.

10 Claims, 7 Drawing Figures

INVENTOR.
TATSUSUKE KADOWAKI
BY
McGlew & Toren
ATTORNEYS

INVENTOR.
TATSUSUKE KADOWAKI

BY

McGlew & Toren
ATTORNEYS

FILM MOVEMENT DIRECTION SWITCHING DEVICE FOR SMALL MOVIE PROJECTORS

BACKGROUND OF THE INVENTION

In one known type of movie projectors, the film can be fed in a direction opposite to the direction in which it is moved when projected in a normal manner, or from the bottom to the top of the projector window, so that the movements of the motion picture images may be reversed on the screen. When such reverse projection is effected, or when the film is rewound from the takeup reel on to the supply reel after projection, it is required to rotate the supply reel in a direction opposite to the direction of its normal rotation and, at the same time, to permit the takeup reel to idle.

In order that the film may be moved in a direction opposite to the direction in which it is moved in normal projection operation, the main shaft, provided in the projector, should be caused to reverse its direction of rotation, and either the film supply reel or the takeup reel should be driven in a predetermined direction, depending on the direction of movement of the main shaft, while the other reel remains idle. Conventional movie projectors provided with a mechanism for switching between the directions of rotation of the main shaft, and for selectively driving one or the other of the two reel support spindles, have hitherto required a very complicated switching device. This has inevitably led to an increase in production cost.

SUMMARY OF THE INVENTION

This invention relates to film movement switching means for small movie projectors and, more particularly, to a novel and improved direction switching device operable to change the direction of rotation of the main projector shaft from normal to reverse, and vice versa, or to disconnect the main shaft from the driving motor, and further operable automatically, responsive to a change in direction of rotation of the main shaft, to drive one of the two reel spindles while permitting the other reel spindle to rotate idly.

More particularly, the direction switching device includes switching mechanism operable selectively to connect the main shaft to the motor to rotate in a normal film feed forward direction or to rotate in the film rewind reverse direction. A reel spindle drive mechanism is coupled to the main shaft for driving thereby. An externally accesible control knob for the switching mechanism operates on the latter to connect the motor to the main shaft for either normal or reverse rotation of the main shaft, or to disconnect the motor from the main shaft. A switching linkage is operatively associated with the control knob and the reel spindle drive mechanism and is operable, when the main spindle drive mechanism and is operable, when the main shaft is rotated in the normal direction, to connect the drive mechanism to rotate the takeup reel spindle, and is operable, when the main shaft is rotated in the reverse direction, to connect the drive mechanism to rotate the supply reel spindle. When the control knob is operated to a position disconnecting the main shaft from the motor, the reel spindle drive mechanism is uncoupled from both reel spindles.

More particularly, the motor has a motor shaft carrying a relatively small friction wheel, and the main shaft carries a pair of spaced friction disks having their friction surfaces facing each other. The motor is mounted on a oscillatable plate so that its friction wheel can be engaged selectively with either of the friction disks, or be disposed in a neutral position out of disengagement with both friction disks. A friction belt drive is trained over a pulley on the main shaft, and is engageable, selectively, with either of a pair of driving wheels, one secured to each of the two reel supporting spindles. The control knob operates a cam, which, through a cam follower, moves associated linkage to swing the motor mounting plate and simultaneously to reciprocate a support arm, containing a pair of pulleys over which the endless friction belt is trained, toward and away from the respective spindle driving wheels.

A feature of the invention is that the supply reel spindle may be used either with a cartridge-type movie film or with an independent reel of movie film. For this purpose, the supply reel spindle is mounted on a vertically displaceable arm which is moveable between a lower position, in which the spindle is operatively associated with a cartridge mounted on the projector, and an upper projected position in which an independent reel may be mounted on the spindle. The supply reel spindle is operatively engageable with the spindle drive mechanism in either of its two possions.

An object of the invention is to provide an improved film movement direction switching device for small movie projectors.

Another object of the invention is to provide such a switching device including switching mechanism operable selectively to connect a main shaft to a motor to rotate in either of two opposite directions, or to disconnect the main shaft from the motor.

A further object of the invention is to provide such a device including a reel spindle drive mechanism coupled to the main shaft for driving thereby.

Another object of the invention is to provide such a switching device including an externally accessible control means for the switching mechanism.

A further object of the invention is to provide such a switching device including means operatively associated with the control means and the drive mechanism and operable, responsive to rotation of the main shaft in the selected direction, to connect the drive mechanism to rotate the proper reel spindle.

For an understanding of the principles of the invention, reference is made to the following description of a typical embodiment thereof, as illustrated in the accompanying drawing.

DESCRIPTION OF THE PREFERRED EMBODIMENT

Figure 1:
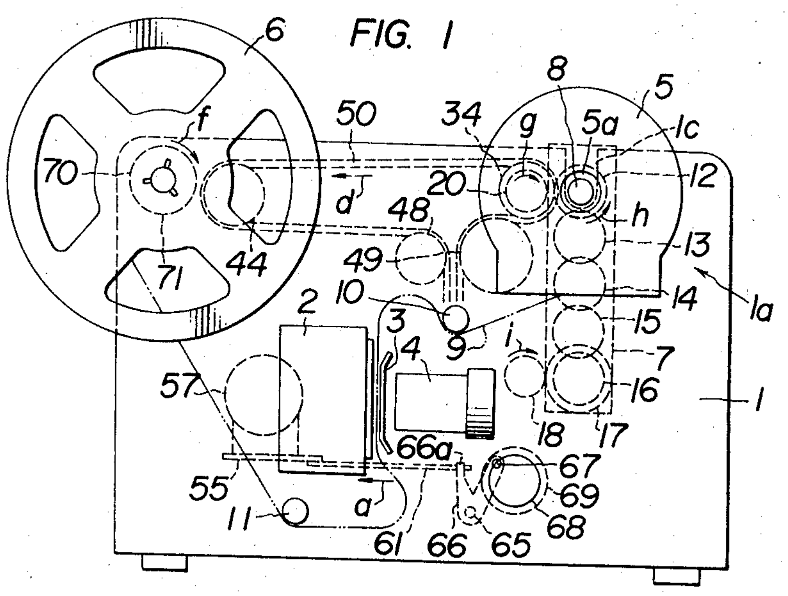
FIG. 1 is a side elevation view of a small movie projector provided with a film movement direction switching device of the invention.

Referring to FIG. 1, a movie projector 1 has a light source 2, a film retaining plate 3, and a projection lens cylinder 4, projector 1 being illustrated as having a film cartridge 5 and a film takeup reel 6 mounted thereon. Film cartridge 5 is latched in position in a film cartridge attaching portion 1*a* by suitable latching means and by fitting a center opening 5*a* of a reel in the cartridge over a film feed spindle 8 mounted on a reel support arm 7. As illustrated, arm 7 is retracted into the cartridge attaching portion 1*a*, when in its cartridge supporting position.

A film 9, paid out from cartridge 5, is guided over a film guide 10, drawn between light source 2 and retainer plate 3, guided over a film guide 11, and wound on takeup reel 6. Reel support arm 7 has provided therein mechanism for reversing the direction of rotation of film supply spindle 8, this mechanism comprising a gear 12 on spindle 8, intermediate gears 13, 14, 15 and 16, and a gear 17 connected to gear 16 through selectively operable clutch means, described hereinafter. Gears 12, 13, 14, 15 and 16 are maintained in meshing engagement with one another. Gear 17 meshes with a drive gear 18, as shown in FIG. 1, when the direction of feed of film 9 is reversed. The gears are driven to rotate film feed spindle 8 in a reverse direction only when the film is moved in a direction opposite to the direction in which it is normally moved, as described hereinafter.

Figures 3, 4, 5, 6, 7:
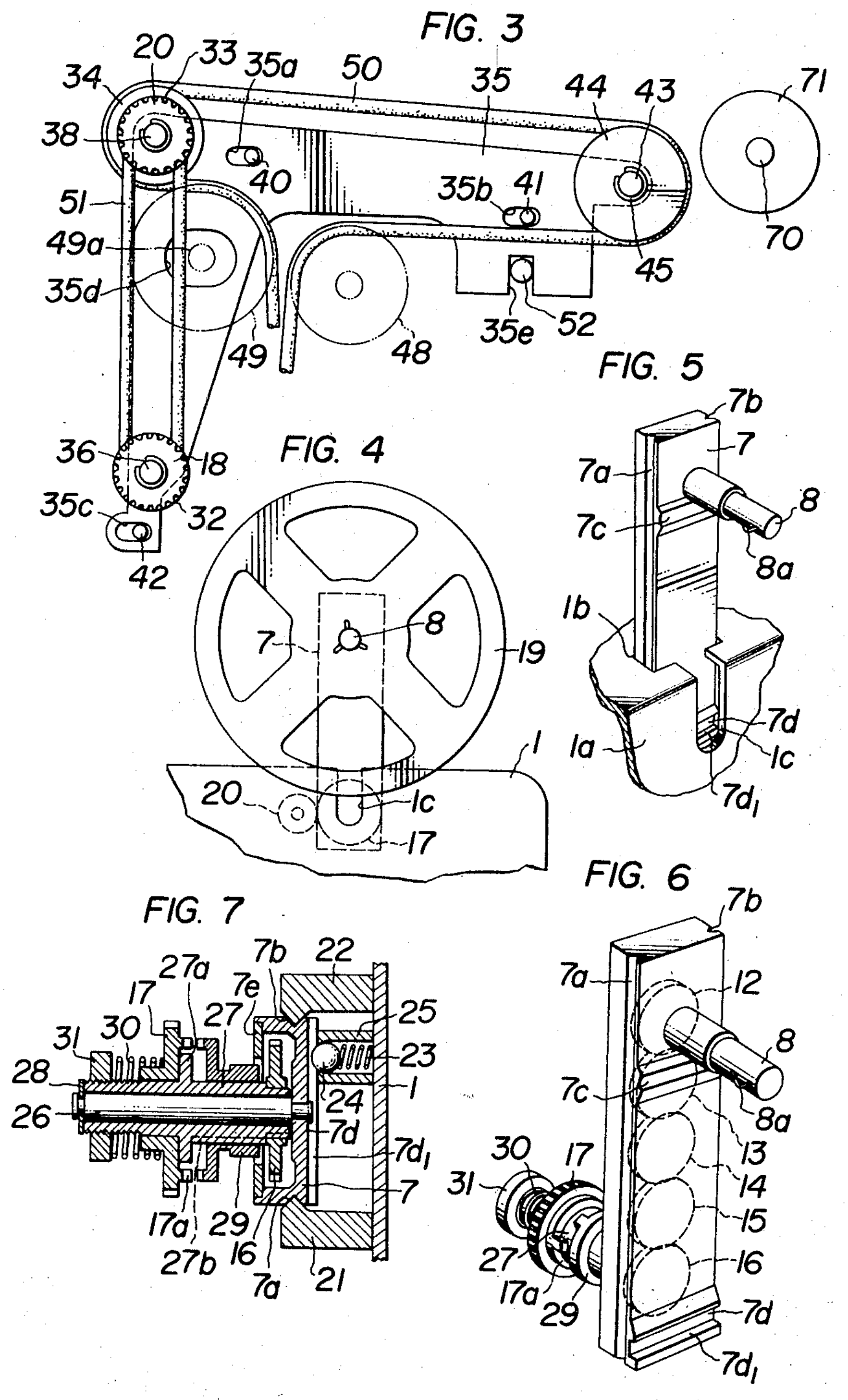
FIG. 3 is a fragmentary side elevation view corresponding to FIG. 2.
FIG. 4 is fragmentary side elevation view of the movie projector of FIG. 1 when it has an open reel mounted thereon.
FIG. 5 is fragmentary side elevation view of the movie projector shown in FIG. 1, illustrating the reel support arm.
FIG. 6 is a perspective view of the reel support arm illustrating the mechanism for reversing the direction of rotation of the supply reel.
FIG. 7 is a transverse sectional view of the reel support arm adjacent its lower end.

As best seen in FIG. 4, an open reel 19 is mounted on projector 1 and supported by reel support arm 7 when reel support arm 7 is moved upwardly and outwardly to an open reel mounting position. Open reel 19 is mounted on spindle 8 by fitting the reel opening thereover, and spindle 8 is provided with a latching member 8*a* (FIG. 5) for latching reel 19 onto the spindle. A drive gear 20 is adapted to mesh with gear 17 of support arm 7 when support arm 7 is in its open reel mounting position and when the film is moved in a direction opposite to its normal direction of movement. Open reel 19 is then rotated by drive gear 20 in a direction opposite to the direction of its normal rotation.

Reel support arm 7 is formed with V-shape grooves 7*a* and 7*b*, as best seen in FIG. 5, extending along opposite vertical side edges of arm 7. Support arm 7 extends loosely through an opening 1*b* formed in the upper part of film cartridge mounting portion 1*a* of projector 1. Opening 1*b* is formed with a cutout 1*c* for receiving therein film spindle 8 of arm 7 when the latter is in the cartridge mounting position in projector 1. Guide numbers 21 and 22, provided on the inner wall of projector 1, engage grooves 7*a* and 7*b*, respectively, for vertical sliding motion of arm 7.

Support arm 7 is formed with clock stops 7*c* and 7*d* in the upper and lower portions, respectively, of its surface adjacent cartridge attaching portion 1*a*. A ball 24, as best seen in FIG. 7, is biased normally by a spring 23 to move forwardly and to engage click stop 7*c*, when reel support arm is withdrawn into the projector, and to engage clock stop 7*d*, when support arm 7 is drawn out of projector 1. Thereby support arm 7 can be latched in its lower cartridge mounting position as well as in its upper or open reel mounting position. Clock stop 7*d* has a projecting lower edge 7*d*₁ which is adapted to be engaged by a clocking member (not shown), formed in the inner wall of projector 1, when support arm 7 is moved upwardly, so as to prevent arm 7 from being pulled entirely out of opening 1*b*. Ball 24 is housed in a support cylinder 25 having a forward end which is caulked inwardly, so as to restrict forward movement of ball 24 under the bias of spring 23 and to prevent scratching of the inner surface of support arm 7 when the latter is vertically reciprocated.

Figure 2:
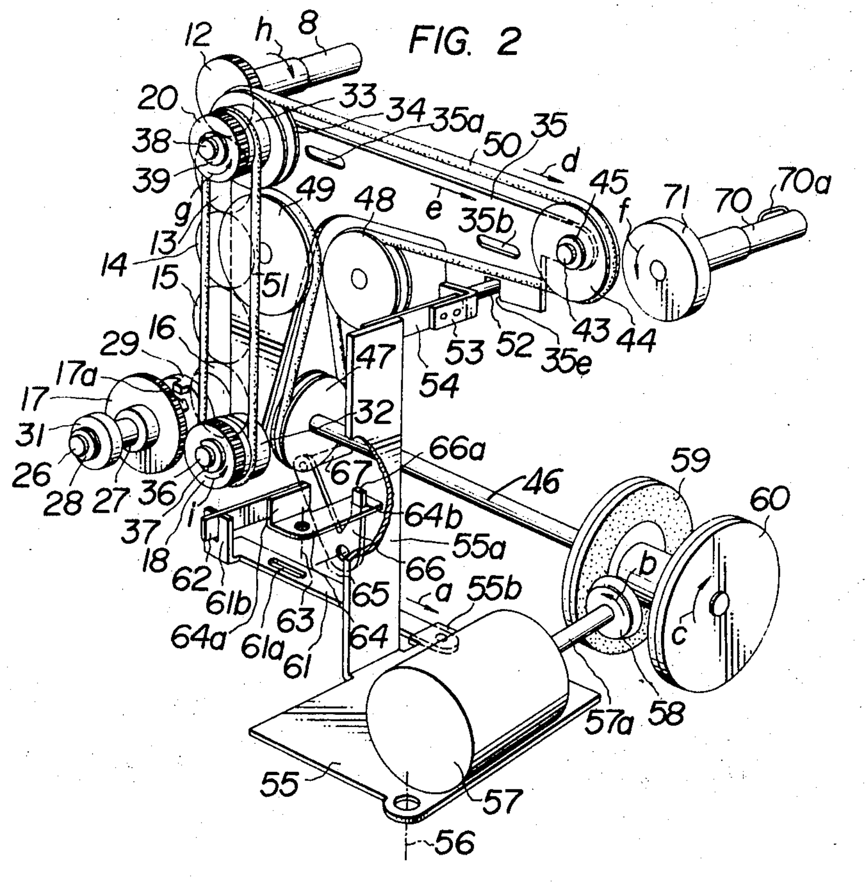
FIG. 2 is a perspective view of the film movement direction switching device, in accordance with one embodiment of the invention.

As best seen in FIGS. 2 and 7, a shaft 26 is secured to the inner side of the lower portion of reel support arm 7, and extends through a sideplate 7*e* into arm 7. A sleeve 27, rotatably mounted on shaft 26, has a flange 27*a*, and sleeve 27 is retained on shaft 26 by an E-ring 28. A key 27*b* is provided on that portion of sleeve 27 which extends from flange 27*a* toward its base, or to the right as viewed in FIG. 7, and a clutch member 29 is slidably mounted on this portion of sleeve 27 and rotatable therewith as a unit through the medium key 27*b*.

A gear 16 is mounted on the portion of sleeve 27 disposed in support arm 7, and gear 17 is loosely mounted on sleeve 27 adjacent flange 27*a*, to the left of flange 27*a* as viewed in FIG. 7. A stop ring 31 is threaded onto the outer or left end of sleeve 27, and a spring 30, extending between stop ring 31 and gear 17, biases gear 17 toward flange 27*a*. The adjacent surfaces of gear 17 and flange 27*a* are thus maintained in frictional engagement with each other. On its surface facing clutch number 29, gear 17 is provided, adjacent its periphery, with a clutch portion 17*a* cooperable with clutch member 29.

When reel support arm 7 is disposed in its cartridge attaching position, as shown in FIG. 1, gear 17 is meshed with drive gear 18, of projector 1, when the film is moved in the rewind direction, or opposite to its direction of normal movement. When support arm 7 is in its open reel mounting position, as shown in FIG. 4, gear 17, which moves upwardly with arm 7, is brought into mesh with gear 20 of projector 1, again when the film is moved in the rewind direction or in a direction opposite to its direction of normal film feed movement.

As shown in FIG. 2, gear 18 is integral with a pulley 32 and gear 20 is integral with a pulley 33. Gear 18 and pulley 32 are rotatably mounted on a shaft 36 at the lower end of a vertical arm of a reel spindle drive mechanism support plate 35 having an inverted L-shape. Gear 18 and pulley 32 are retained on shaft 36 by an E-ring 37. Gear 20, pulley 33 and a larger diameter pulley 34 are rotatably mounted on a shaft 38 at the shoulder of support plate 35, and retained shaft 38 by an E-ring 39.

As best seen in FIG. 3, the horizontal arm of support plate 35 is formed with horizontally oriented slots 35*a* and 35*b*, and the vertical arm of plate 35 is formed, at its lower end portion, with a horizontally oriented slot 35*c*. Slots 35*a*, 35*b* and 35*c* receive respective pins 40, 41, and 42, secured to the inner wall (not shown) of projector 1, so that support plate 35 is slidably supported by these pins. A pulley 44 is rotatably mounted on a shaft 43 at the free end of the horizontal arm of support plate 35, and retained on shaft 43 by an E-ring 45.

As best seen in FIG. 2, a pulley 47 is secured to rotate with main shaft 46 of projector 1, and an endless belt 50 is trained around large pulley 34, pulley 44 and pulley 47 through the medium of direction change pulleys 48 and 49 rotatably mounted on shafts secured to the inner wall of the projector. An endless belt 51 is trained about pulleys 32 and 33. Shaft 38, mounting pulley 34, and shaft 43, mounting pulley 44, extend normal to main shaft 46 of projector 1, but direction change pulleys 48 and 49 are tilted suitably to prevent belt 50 sliping off therefrom when belt 50 is driven or rotated. Shaft 49*a* mounting pulley 49 extends through a slot 35*d* formed in support plate 35, as shown in FIG. 3, so the sliding movement of support plate 35 is not restricted by shaft 49*a*.

The lower edge of the horizontal arm of support plate 35 is formed with a cutout 35*e* (FIG. 3) in which there is engaged a pin 52. As best seen in FIG. 2, pin 52 is secured to a support 53 which is firmly secured to an upright arm 55*a* of a motor support plate 55 through the medium of a resilient connecting plate 54. Motor support plate 55 is supported for pivotal movement, in a horizontal plane, by a shaft 56 secured to a fixed part of projector 1, and support plate 55 has a motor 57 mounted thereon. Motor 57 has a drive shaft 57*a* on which there is secured a friction drive wheel 58. Friction driven wheels 59 and 60, having friction surfaces facing each other, are secured, in axially spaced relation, at one end of main shaft 46, and friction wheel 58 is interposed between friction wheels 59 and 60.

As illustrated in FIG. 2, a connecting link 61 has one end pivotally connected to a corner 55*b* of support plate 55, and is slidably guided by a fixed pin (not shown) extending into a slot 61*a* in link 61. The other end of link 61 is bent upwardly and formed with a forked portion 61*b* which loosely receives a bar 62 secured to one side of an upright flange 64*a* of a lever 64 pivotally supported, at one end, by a shaft 63. The other end of lever 64 is formed with an opening 64*b* receiving one arm 66*a* of a hook shape lever 66 pivotally supported by a horizontal shaft 65. The other arm of lever 66 carries a pin 67 engaging a cam plate 69 having a cam groove and formed integrally with a film movement switching knob 68, shown in FIG. 1.

Knob 68 is rotatably mounted on the sidewall of projector 1 and, when knob 68 is rotated, cam 69 is rotated therewith, thereby causing lever 66 to pivot clockwise or counterclockwise about shaft 65, or to pivot to a neutral position. When lever 66 is moved clockwise, film 9 can be moved in its normal or forwardly direction and, when lever 66 is moved counterclockwise, film 9 can be moved in the reverse or rewind direction. Film 9 remains stationary when lever 66 is in its neutral position. Lever 66 is moved selectively to any one of its three positions by operating knob 68, and suitable means, such as releasable detents or the like, may be provided to latch knob 68 in each of the normal movement, neutral and reverse movement positions. However, the neutral position may either be provided or may be omitted but, when it is provided, it may be designated by the symbol "OFF."

If knob 68 is turned to the "normal movement" position, lever 66 is moved clockwise about shaft 65 and lever 64 is moved counterclockwise about shaft 63, as seen from above in FIG. 2. Thereby, link 61 is moved in the direction of arrow *a*, and causes motor support plate 55 to pivot clockwise about shaft 56, again as seen from above in FIG. 2. Thereby, shaft 57*a* of motor 57 is moved in the direction to engage friction driving wheel 58 with the friction surface of friction driven wheel 60. Wheel 58 normally is rotated in the direction of the arrow *b* by motor 57, so that wheel 60 is rotated in the direction of arrow *c* when it is energized by friction driving wheel 58. Rotation of wheel 60 in the direction of arrow *c* effects rotation of main shaft 46 and pulley 47 in the same direction, so that belt 50 begins to travel in the direction of arrow *d* of FIG. 2.

When support plate 55 is pivoted clockwise about shaft 56, its portion 55*a* moves in the same direction and causes pin 52 to move reel spindle drive mechanism support plate 53 in the direction of arrow *e*, so that belt 50 is brought into contact with a friction wheel 71 secured to the inner end of film takeup reel spindle 70 on which film takeup reel 6, of FIG. 1, is mounted. Since belt 50 is traveling in the direction of arrow *d*, friction wheel 71 begins to rotate, in a slave relation, in the direction of arrow *f* causing film takeup reel spindle 70 to rotate in the same direction.

Spindle 70 is formed with a resilient engaging portion 70*a* to engage and retain takeup reel 6 in position thereon, and reel 6 also rotates in the direction of arrow *f* to wind thereon film 9 paid out from the supply reel or cartridge and moving in the normal or film feed direction. At the same time, travel of belt 50 in the direction of arrow *d* effects rotation of gear 20, through large pulley 34, and such rotation is transmitted to gear 18 through pulley 33 and belt 51. However, since support plate 35 has been moved in the direction of arrow *e*, gears 20 and 18 are not connected to the mechanism for driving film supply reel spindle 8 in the reverse or rewind direction, so that spindle 8 and the supply reel or cartridge rotate idly.

If knob 68 is turned to the "neutral" position, motor support plate 55 is displaced slightly in the direction opposite to arrow *a*, so that friction drive wheel 58 is brought to a position intermediate friction wheels 59 and 60 on main shaft 46. Support plate 35 is moved slightly in a direction opposite to arrow *e*, so that pulley 44 and gears 18 and 20 are moved to a position in which they are released from engagement with friction wheel 71 and the mechanism for driving supply reel spindle 8 in the reverse or rewind direction. Under these conditions, film 9 remains stationary and only one frame is projected. Motor 57, of course, may be deenergized at this time.

Rotation of knob 68 to the "reverse movement" position causes lever 66 to pivot counterclockwise about shaft 65, and causes lever 64 to pivot clockwise about shaft 63, as viewed from above in FIG. 2. Thus, connecting link 61 moves in a direction opposite to arrow *a*, causing motor support plate 55 to move in the counterclockwise direction about shaft 56, again as viewed from above in FIG. 2. Movement of support plate 55 in the counterclockwise direction engages driving friction wheel 58 with the friction surface of wheel 59 on main shaft 46, thereby rotating wheel 59 and main shaft 46 in a direction opposite to arrow *c*.

Rotation of main shaft 46 is transmitted to belt 50 through pulley 47, causing belt 50 to travel in a direction opposite to arrow *d*, and causing gear 20, through large pulley 34, to rotate in the direction of arrow *g*. This rotates gear 18 in the same direction through pulley 33, belt 51 and pulley 32. At the same time, support plate 35 moves, together with motor support plate 55, in direction opposite to arrow *e* to mesh gear 18 with gear 17 of the mechanism for driving supply reel spindle 8 in the reverse or rewind direction, when support arm 7 is in the cartridge mounting position, and meshes gear 20 with gear 17, when support arm 7 is in the open reel mounting position. Accordingly, the mechanism for driving supply reel spindle 8 in the reverse or rewind direction is rendered operative irrespective of the position of reel support arm 7, so that spindle 8 is rotated in the direction of arrow *h* to rewind film 9 thereon. At this time, takeup reel spindle 70 rotates idly.

If, under these conditions, clutch 29 of FIG. 7 is operated by an externally accessible means to release clutch 29 from engagement from gear 17, then it is possible to project the film on the screen while the film is moving in the rewind direction, or in a reverse direction. If clutch 29 is maintained engaged with gear 17, then it is possible to move film 9 in the reverse direction without contact with any part, thereby permitting rewinding of film 9 on the supply reel or in the supply cartridge at high speed. The provision of the resilient arm permits maintaining friction wheel 58 pressed against either one of friction wheels 59 and 60 mounted on main shaft 46.

From the foregoing, it will be appreciated that the film movement direction switching device of the invention has many advantages. Thus it not only permits switching the direction of movement of the film by a single operation but also is simple in construction, making it possible to obtain an overall compact size in the movie projector. While the switching device has been described as used in a movie projector of the type capable of using selectively either a film cartridge or an open reel, it will be understood that the device has application to other types of movie projectors as well.

While a specific embodiment of the invention has been shown and described in detail to illustrate the application of the principles of the invention, it will be understood that the invention may be embodied otherwise without departing from such principles.

What is claimed is:

1. A film movement direction switching device, for small movie projectors having a driving motor, a main shaft, and film supply and takeup reel supporting shafts, said device comprising, in combination, switching mechanism operable selectively to connect said main shaft to said motor to rotate in a normal film feed forward direction or to rotate in a film rewind direction; reel spindle drive mechanism coupled to said main shaft for driving thereby; externally accessible control means for said switching mechanism operable on said switching mechanism to connect said motor to the main shaft for either normal or reverse rotation of said main shaft, or to disconnect said motor from said main shaft; and means operatively associated with said control means and said drive mechanism and operable, when said main shaft is rotated in said normal direction, to connect said drive mechanism to rotate said takeup reel spindle and operable, when said main shaft is rotated in said reverse direction, to connect said drive mechanism to rotate said supply reel spindle.

2. A film movement direction switching device, as claimed in claim 1, in which said driving motor has a drive shaft carrying a friction drive wheel; a pair of friction driven wheels secured on said main shaft in axially spaced relation with friction surfaces facing each other, said friction drive wheel being positioned between said friction driven wheels; said switching mechanism comprising means operable to engage said friction drive wheel selectively with either of said friction driven wheels or to disengage said friction drive wheel from both of said friction driven wheels.

3. A film movement direction switching device, as claimed in claim 2, including a plate supporting said driving motor; and means mounting said plate for swinging movement about a vertical axis; said switching mechanism including means selectively operable to swing said plate in either direction to engage said friction drive wheel with a selected one of said friction driven wheels, or to disengage said friction drive wheel from both of said friction driven wheels.

4. A film movement direction switching device, claimed in claim 1, in which said reel spindle d drive mechanism comprises respective friction wheels secured to said reel supporting shafts; a drive pulley secured to rotate with said main shaft a pair of driven pulleys each adjacent and aligned with a respective spindle friction wheel; and an endless belt trained around said drive pulley and said driven pulleys and selectively frictionally engageable with either of said spindle friction wheels by said last-named means in accordance with the direction of rotation of said main shaft.

5. A film movement direction switching device, as claimed in claim 4, including an arm mounted for reciprocation between said spindle friction wheels; said driven pulleys being mounted at respective opposite ends of said arm; and linkage means connecting said last-named means to said switching mechanism and operable to reciprocate said arm in respective directions in accordance with the direction of rotation of said main shaft.

6. A film movement direction switching device, as claimed in claim 5, including a substantially horizontal plate support said motor; means mounting said support plate for oscillation about a substantially vertical pivot axis: said motor including a driving member; a pair of driven members secured to rotate with said main shaft; said switching mechanism being operable to oscillate said support plate to engage said driving member with either of said driven members, or to disengage said driving member from both of said driven members; and arm means secured to said support plate and engaged with said arm to reciprocate said arm in accordance with oscillation of said support plate.

7. A film movement direction switching device, as claimed in claim 6, in which said arm is formed with an upwardly opening slot in one edge thereof; a pin engaged in said slot; and resilient means connecting said pin to said arm means.

8. A film movement direction switching device, as claimed in claim 5, in which said control means comprises an externally accessible control knob; a cam secured to rotate with said control knob; and a cam follower engaged with said cam and included in said linkage means.

9. A film movement direction switching device, as claimed in claim 8, in which said linkage means included a hook-shape lever; means mounting said lever for pivoting movement; said cam follower being secured to one arm of said hook-shape lever; a two-arm lever; means mounting said two-arm lever for pivotal movement; the other arm of said hook-shape lever being engaged with one arm of said two-arm lever; and a link articulating the other arm of said two-arm lever to said support plate.

10. A film movement direction switching device, as claimed in claim 1, including an arm mounting said supply reel supporting spindle; said arm being vertically reciprocable in said projector between a retracted position, in which a film supply cartridge can be mounted on said film supply reel spindle, and a projected position, in which an open reel of film can be mounted on said supply reel spindle; said reel spindle drive mechanism being effective in both positions of said support arm.

* * * * *